US009156921B2

(12) United States Patent
Miyake

(10) Patent No.: US 9,156,921 B2
(45) Date of Patent: Oct. 13, 2015

(54) ORGANOCATALYZED PHOTOREDOX MEDIATED POLYMERIZATION USING VISIBLE LIGHT

(71) Applicant: California Institute of Technology, Pasadena, CA (US)

(72) Inventor: Garret M. Miyake, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/331,323

(22) Filed: Jul. 15, 2014

(65) Prior Publication Data

US 2015/0018446 A1 Jan. 15, 2015

Related U.S. Application Data

(60) Provisional application No. 61/846,212, filed on Jul. 15, 2013.

(51) Int. Cl.
*C08F 2/50* (2006.01)
*C08F 2/46* (2006.01)
*C08G 61/04* (2006.01)
*C08F 2/48* (2006.01)
*C08F 112/08* (2006.01)
*C08F 118/08* (2006.01)
*C08F 120/14* (2006.01)
*C08F 120/52* (2006.01)

(52) U.S. Cl.
CPC ... *C08F 2/48* (2013.01); *C08F 2/50* (2013.01); *C08F 112/08* (2013.01); *C08F 118/08* (2013.01); *C08F 120/14* (2013.01); *C08F 120/52* (2013.01); *C08F 2438/01* (2013.01)

(58) Field of Classification Search
CPC ............ C08F 2/48; C08F 112/08; C08F 2/50; C08F 118/08; C08F 120/52; C08F 2438/01; C08F 120/14
USPC .................. 522/67, 6, 71, 189, 184, 1; 520/1
See application file for complete search history.

(56) References Cited

U.S. PATENT DOCUMENTS

| | | | | |
|---|---|---|---|---|
| 3,607,272 | A * | 9/1971 | Rust .............................. | 430/292 |
| 2002/0165331 | A1* | 11/2002 | Vanhoorne et al. ........... | 526/220 |
| 2004/0138323 | A1* | 7/2004 | Stenzel-Rosebaum et al. ............................ | 521/142 |
| 2006/0004160 | A1* | 1/2006 | Favier et al. ................ | 526/219.6 |
| 2007/0088140 | A1* | 4/2007 | Benicewicz et al. .......... | 526/217 |

FOREIGN PATENT DOCUMENTS

JP 2006-016488 * 1/2006

OTHER PUBLICATIONS

Shimizu, JP 2006-016488 Machine Translation, Jan. 19, 2006.*

Fournier, David et al, 1,8-diazabicyclo[5.4.0]undec-7-ene (DBU) as (ligand for atom transfer radical polymerization (ATRP), 2005, European Polymer Journal, 41, 1576-1581.*
Braunecker, "Controlled/living Radical Polymerization: Features, developments, and perspectives", Polym. Sci., Jan. 2007, 32(1), 93-146.
Fors et al, "Control of a Living Radical Polymerization of Methacrylates by Light", Ange. Chem., Int. Ed., Aug. 27, 2012, 51(35), 8850-8853.
Goto et al, "A Systematic Kinetic Study in Reversible Chain Transfer Catalyzed Polymerizations (RTCPs) with Germanium, Tin, Phosphorus, and Nitrogen Catalysts", Macromol. Chem. Phys., 2010, 211, 594-600, Published online: Feb. 1, 2010.
Goto et al, "Reversible Complexation Mediated Living Radical Polymerization (RCMP) Using Organic Catalysts", Macromolecules, Oct. 19, 2011, 44, 8709-8715.
Goto et al, "Reversible Generation of a Carbon-Centered Radical from Alkyl Iodide Using Organic Salts and Their Application as Organic Catalysts in Living Radical Polymerization", J. Am. Chem. Soc., Jul. 31, 2013, 135(30), 11131-11139, Published online: Jul. 19, 2013.
Hawker, "New Polymer Synthesis by Nitroxide Mediated Living Radical Polymerization", Chem. Rev., 2001, 101(12), 3661-3688, Published Online: Oct. 25, 2001.
Kamigaito, "Metal-Catalyzed Living Radical Polymerization", Chem. Rev., 2001, 101, 3689-3746, Published Online: Dec. 12, 2001.
Lalevee, "Photoredox Catalysis for Polymerization Reactions", Chimia Intern. J. for Chemistry, Jun. 2012, 66(6), 439-441.
Matyjaszewski, "Atom Transfer Radical Polymerization (ATRP): Current Status and Future Perspectives", Macromolecules, May 22, 2012, 45(10), 4015-4039, Published Online: Apr. 11, 2012.
Matyjaszewski, "Atom Transfer Radical Polymerization", J. Chem. Rev., 2001, 101(9), 2921-2990, Published online: Sep. 12, 2001.
Moad, G.; "Radical Addition-Fragmentation Chemistry in Polymer Synthesis", Polymer, Mar. 2008, 49, 1079-1131.
Narayanam, "Visible Light Photoredox Catalysis: Applications in Organic Synthesis", Chem. Soc. Rev., 2011, 40, 102-113, Published Online: Jun. 8, 2010.
Nguyen et al, "Intermolecular Atom Transfer Radical Adition to Olefins Mediated by Oxidative Quenching of Photoredox Catalysts", J. Am. Chem. Soc., Mar. 7, 2011, 133, 4160-4163.
Ouchi, et al, "Transition Metal-Catalyzed Living Radical Polymerization: Toward Perfection in Catalysis and Precision Polymer Synthesis", M. Chem. Rev., 2009, 109(11), 4963-5050, Published Online: Sep. 29, 2009.
Prier et al, "Visible Light Photoredox Catalysis with Transition Metal Complexes: Applications in Organic Synthesis", Chem. Rev., Jul. 10, 2013, 113(7), 5322-5363.

(Continued)

*Primary Examiner* — Ling Choi
*Assistant Examiner* — Jessica E Whiteley
(74) *Attorney, Agent, or Firm* — Baker & Hostetler LLP

(57) ABSTRACT

The present invention is directed to method of forming a polymer comprising exposing a mixture comprising an organic pre-polymer, an organic photoredox catalyst, and an organic initiator to a source of visible or near-infrared light under conditions and for a time sufficient to polymerize the organic pre-polymer, and polymers and articles derived therefrom.

20 Claims, 6 Drawing Sheets

(56) References Cited

OTHER PUBLICATIONS

Ravelli et al, "Photoorganocatalysis. What for?", Chem. Soc. Rev., Sep. 2013, 42, 97-113.
Rosen, "Single-Electron Transfer and Single-Electron Transfer Degenerative Chain Transfer Living Radical Polymerization", Chem. Rev., Nov. 2009, 109(11), 5069-5119, Published Online: Oct. 9, 2009.
Xu et al, "A Robust and Versatile Photoinduced Living Polymerization of Conjugated and Unconjugated Monomers and its Oxygen Tolerance", J. Am. Chem. Soc., Apr. 9, 2014, 136(14):5508-19.
Yamago, "Recent Progress in the Use of Photoirradiation in Living Radical Polymerization", Polymer, Feb. 5, 2013, 54, 981-994.
Yamago, S. "Precision polymer synthesis by degenerative transfer controlled/living radical polymerization using organotellurium, organostibine, and organobismuthine chain-transfer agents", Chem. Rev., Nov. 2009, 101, 5051-5068.
Yoon, "Visible Light Photocatalysis As a Greener Approach to Photochemical Synthesis", Nature Chem., Jul. 2010, 2(7), 527-532.
Zhang, "Free Radical Polymerization Initiated and Controlled by Visible Light Photocatalysis at Ambient Temperature", Macromolecules, Sep. 2011, 44, 7594-7599.

\* cited by examiner

ORGANOCATALYZED PHOTOREDOX MEDIATED POLYMERIZATION USING VISIBLE LIGHT

CROSS REFERENCE TO RELATED APPLICATIONS

This application claims priority to U.S. Application No. 61/846,212, filed Jul. 15, 2013, the contents of which are incorporated by reference herein in their entirety.

TECHNICAL FIELD

The present disclosure is directed to methods of preparing polymers with functionalizable chain-end groups, under mild conditions, without the use of metal- or metalloid-containing catalysts.

BACKGROUND

Nearly 100 million tons of polymers are produced annually through radical polymerization making it one of the most industrially important polymerization methodologies to date. Traditional routes of radical polymerization use initiators such as azobisisobutyronitrile (AIBN), where the radical is generated through thermal decomposition or photolysis, and is then able to initiate the polymerization. However, these methods require harsh conditions, such as, high temperature or ultra-violet (UV) irradiation. Furthermore, these methods generally produce polymers with ill-defined characteristics, including broad or multi-modal molecular weight distributions.

More recently, controlled radical polymerizations have been developed, including atom transfer radical polymerization (ATRP), nitroxide mediated polymerization (NMP), iodine-transfer polymerization (ITP), reversible addition-fragmentation transfer (RAFT) polymerization, telluride mediated polymerization (TERP), stibine-mediated polymerization (SMP), etc. to produce polymers with controlled molecular weights (MWs) and molecular weight distributions. In particular, ATRP has proven highly successful because it not only produce well-defined polymers, but the polymers have chain-end groups that are readily susceptible to further modifications. Nonetheless, these routes generally require harsh conditions and, more concerning, contaminate the final polymeric product with trace metal catalyst residues that ultimately inhibit the application potential of these materials in medicinal or electronic applications. There is a need to produce well-defined polymeric materials, with functionalizable chain-end groups, under mild conditions (i.e. low temperature, non-UV light source), while eliminating the use of metal catalysts that would contaminate the final polymeric product.

SUMMARY

The present invention(s) is directed to solving the problem of producing well-defined polymeric materials, with functionalizable chain-end groups, under mild conditions (i.e. low temperature, non-UV light source), without the use of metal or metalloid catalysts that contaminate the final polymeric product.

Certain embodiments of the present invention include those methods of forming a polymer, each method comprising exposing a mixture comprising an organic pre-polymer, an organic photoredox catalyst, substantially free of a photoredox catalyst comprising a metal or metalloid, and an organic initiator to a source of visible or near-infrared light under conditions and for a time sufficient to polymerize the organic pre-polymer. Such organic pre-polymers or initiators may include those having polymerizable olefinic moieties.

In certain embodiments, the photoredox catalyst is an organic molecule, including aromatic or polyaromatic structures, capable of reaching an excited electronic state when exposed to the visible or near infrared light.

In certain other embodiments, the organic initiator contain at least one carbon-halogen bond, nitrogen-halogen bond, sulfur-halogen bond, oxygen-halogen bond, thiocyanate group, or thiocarbamate group, preferably an organic halide or α-halocarbonyl, that exhibits a redox potential in a range of about −0.2 to about −2 V vs. NHE.

Generally, the methods proceed by reversible addition-fragmentation transfer (RAFT) or atom transfer radical polymerization (ATRP), and form polymers having a Polydispersity Index (PDI or Mw/Mn ratio) in a range of about 1 to about 2.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, processes, devices, and systems disclosed. In addition, the drawings are not necessarily drawn to scale. In the drawings.

DETAILED DESCRIPTION OF ILLUSTRATIVE EMBODIMENTS

Figure 1:
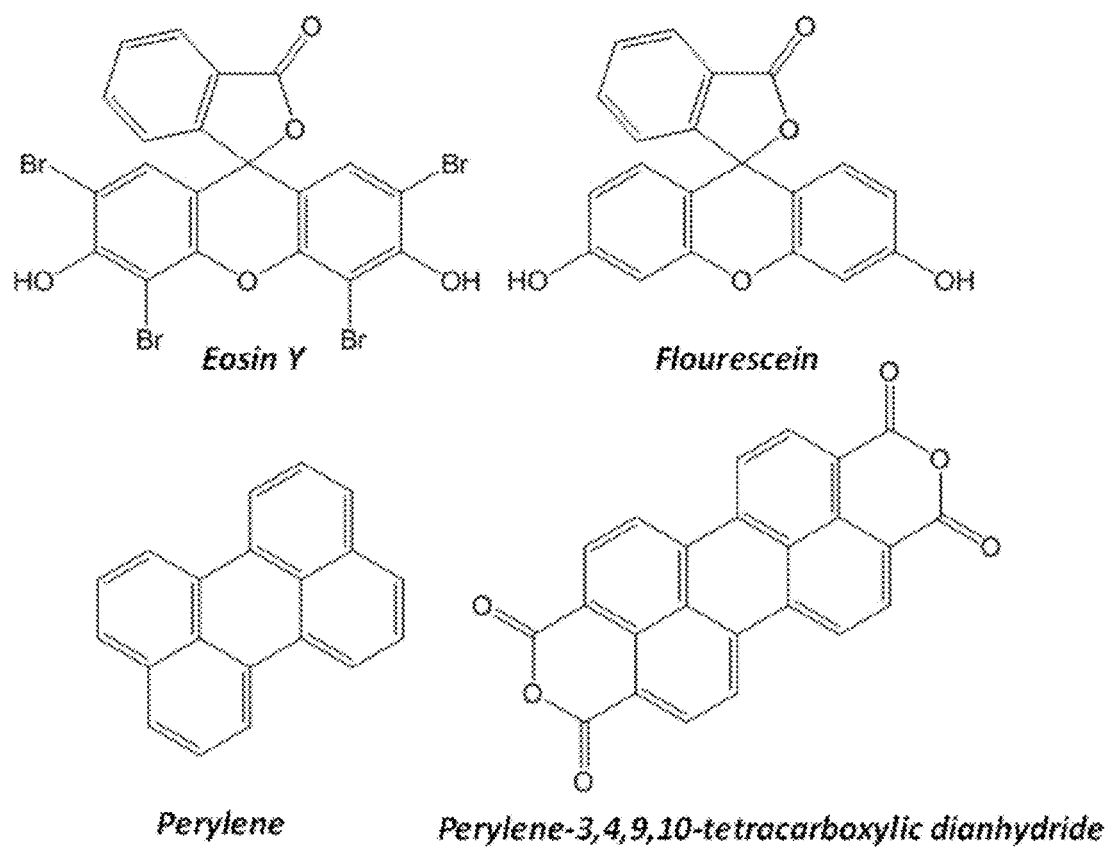
FIG. 1 illustrates several exemplary organic photoredox catalysts used in this work.

The present invention is directed to methods of polymerizing organic pre-polymers comprising exposing an organic photoredox catalyst, and an organic initiator to a source of visible or near-infrared light under conditions and for a time sufficient to polymerize the organic pre-polymer. Most preferably, the methods employ systems which are substantially free of a photoredox catalyst comprising a metal or metalloid.

These methods, and the resulting polymer products are expected to be of interest to any company or consumer that requires a polymeric product with no metal or metalloid catalyst residue, for example in biomedical or electronic applications. Additionally, because this process produces polymers through a green methodology, companies or consumers that desire an environmentally friendly process to be used to produce their product would be interested in this technology. For example, the ability to use natural sunlight to promote new polymer carbon-carbon bond formation in producing metal- and metalloid-free polymers is particularly attractive.

The present invention may be understood more readily by reference to the following description taken in connection with the accompanying Figures and Examples, all of which form a part of this disclosure. It is to be understood that this invention is not limited to the specific products, methods, processes, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this specification, claims, and drawings, it is recognized that the descriptions refer to compositions and processes of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method or process steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of".

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

The present invention includes those embodiments comprising methods of forming a polymer, each method comprising exposing a mixture comprising an organic pre-polymer, an organic photoredox catalyst, and an organic initiator to a source of visible or near-infrared light under conditions and for a time sufficient to polymerize the organic pre-polymer. In preferred embodiments, the mixture is substantially free of photoredox catalysts comprising metals or metalloids. In this regard, unless otherwise stated, the term "substantially free of photoredox catalysts comprising metals or metalloids" is defined as meaning that the mixture is absent of any or all deliberately added photoredox catalyst containing a metal or metalloid, including those known to catalyze polymerizations. Additional embodiments provide that this term, where specified, refers to methods in which the mixtures contain less than 100 ppm, less than 50 ppm, less than 25 ppm, less than 10 ppm, less than 5 ppm, less than 4 ppm, less than 3 ppm, less than 2 ppm, or less than 1 ppm of any or any given metal- or metalloid-containing photocatalysts, especially those known for use in such polymerization transformations; e.g., based on copper, molybdenum, osmium Ru(bipyridine)$Cl_2^{2+}$ or Ir(ppy)$^{3+}$, Ge, or Sn. Without intending to be bound by the correctness or incorrectness of any particular theory, the methods appear to operate predominantly or entirely by the action of the organic photoredox catalyst, and an organic initiator in the presence of light.

Such metal- or metalloid-containing photoredox catalysts include those catalysts containing metals, including gallium and tin and transition metals, and metalloids. As used herein, "transition metals" are defined as those elements whose atom has a partially filled d sub-shell, or which can give rise to cations with an incomplete d sub-shell. These include both those elements in the d-block of the periodic table, which includes groups 3 to 12 on the periodic table, and those in the f-block lanthanide and actinide series are also considered transition metals, the latter known as "inner transition metals. As used herein, the term "metalloids" include the six commonly recognized metalloids, those being boron, silicon, germanium, arsenic, antimony and tellurium. Note that these metals or metalloids are excluded only to the extent that they photocatalyze the reactions described herein, either by themselves or when incorporated into a complex or system capable of photocatalysis. That is, exclusions of certain metal- or metalloid-containing photoredox catalysts are not intended to exclude metal or metalloid moieties which are incapable of acting as photocatalysts (e.g., silicon-containing siloxane moieties).

In the present context, the organic pre-polymer may be a monomer or oligomer having polymerizable functional groups. Monomers, oligomers, or even certain polymers, as described further below, are considered suitable substrates the methods described herein. In particular, monomers, oligomers, or even certain polymers, comprising unsaturated carbon-carbon or carbon-nitrogen bonds, or other groups capable of radical polymerization are suitable substrates for use in the present invention. Substrates comprising carbon-carbon double bonds are preferred. Such suitable organic pre-polymers including those comprising optionally substituted alpha olefins (including, but not limited to ethylene, propylene, butene, pentene, hexene, tetrafluorethylene, vinyl chloride, vinylidine chloride, or styrene), diolefins (including, but not limited to butadiene, isoprene, or chloroprene), internal olefins (including, but not limited to 2- or 3-hexene), cyclic olefins (including, but not limited to norbornene, cyclobutene, cyclooctene, or cyclooctadiene), including acrylates, methacrylates, acrylamides, methacrylamides, acrylonitrile, vinyl acetates, vinyl ketones, vinyl aldehydes, vinyl chlorides, vinyl ethers, vinyl amines, vinyl silsesquioxanes, vinyl phosphonates, or vinyl sulfonates, or a mixture thereof. Exemplary, non-limiting structures additionally include methyl methacrylate (MMA), methyl acrylate (MA), tert-butyl acrylate (tBuA), styrene (St), N,N-dimethylacrylamide (DMA), N-(2-hydroxypropyl)methacrylamide (HPMA), N-isopropylacrylamide (NIPAAm), oligoethylene glycol methyl ether methacrylate (OEGMA), oligoethylene glycol methyl ether acrylate (OEGA), isoprene, vinyl acetate, vinyl pivalate (VP), N-vinyl pyrrolidinone (NVP), and dimethyl vinylphosphonate (DVP). In preferred embodiments, the organic pre-polymer comprises an acrylate or methacrylate, for example an alkyl, alkylene, benzyl, or aryl substituted acrylate or methacrylate.

As described herein, the organic photoredox catalysts may be sensitive to, and the light sources may provide wavelengths of light corresponding to, ultra-violet, visible, or near-infrared light, though visible (for example, 300 nm to 800 nm) or near-infrared light (for example, 800 nm to 1050 nm) is preferred, and visible light is especially preferred. Each of these classes of light represents independent embodiments. In some embodiments, the organic photoredox catalyst of the present invention(s) is an organic molecule capable of reaching an excited electronic state when exposed to either visible, or near infrared light, or both visible and infrared light, and having at least one absorption or emission wavelength in a range of from about 300 nm to about 400 nm, from about 400 nm to about 500 nm, from about 500 nm to about 600 nm, from about 600 nm to about 700 nm, from about 700 nm to about 800 nm, from about 800 nm to about 900 nm, from about 900 nm to about 1000 nm, from about 1000 nm to about 1100 nm, or any combination thereof. In exemplary embodiments, these ranges encompass from about 300 nm to about 1000 nm, preferably in a range of from about 300 nm to about 800 nm, or from about 300 nm to about 600 nm. Additional embodiments also include those methods the light is natural sunlight, and where the organic photoredox catalysts are active in the presence of this natural sunlight.

In certain preferred embodiments, the organic photoredox catalyst comprises an aromatic or polyaromatic structure. See, e.g., FIG. 1. Such structures may be otherwise characterized as dyes or building blocks for liquid crystals, as the structures share certain structural properties which also make them otherwise be useful as pH indicator dyes, fluorescent dyes, or liquid crystal semiconductors. Such descriptions as comprising an aromatic or polyaromatic structure excludes those catalysts such as N-iodo-succinimide, tetra(dimethylamino)ethylene, triethylamine, or other aliphatic amine catalysts.

The methods appear to rely on a mechanism that provides for the photolytic generation of radicals, as opposed to simple thermal generation; e.g., from iodo-amines, e.g., carbon radicals generated from alkyliodides and amine catalysts, as disclosed in Goto, et al., *J. Amer. Chem. Soc.*, 2013, 135, 11131-11139. For example, in the absence of light, the mixtures are otherwise stable toward polymerization, up to 72 hours at ambient temperatures. Furthermore, precise control over the polymerization propagation is achieved with pulsed irradiation sequences. Still further, it appears preferable that the methods employ light sources, where the light delivers a wavelength of light coincident with at least one absorption wavelength of the photoredox catalyst. The light used in the inventive methods may be monochromatic (i.e., comprising a single wavelength or color) or polychromatic (comprising a plurality of wavelengths or colors). Polychromatic light is preferred only to the extent that most convenient light sources provide broad spectra of light.

Certain exemplary, non-limiting organic photoredox catalysts include Eosin (including Eosin Y (also known as Eosin Y ws, Eosin yellowish, Acid Red 87, C.I. 45380, bromoeosine, bromofluoresceic acid, D&C Red No. 22); Eosin B (eosin bluish, Acid Red 91, C.I. 45400, Saffrosine, Eosin Scarlet, or imperial red), Fluorescein (including its chemical derivatives, Eosin, Carboxyfluorescein, Fluorescein isothiocyanate (FITC), Fluorescein amidite (FAM), Merbromin, Erythrosine, and Rose Bengal), perylene (including its derivatives, e.g., including perylene-3,4,9,10-tetracarboxylic dianhydride), rubrene, tetracene (including derivatives such as 9,10-bis(phenylethynyl)anthracene (BPEA)), or pentacene. Perylene has worked well in this capacity.

Other exemplary, non-limiting organic photoredox catalysts include Gentian violet (Methyl violet 10B), Malachite green, Thymol blue, Methyl yellow, Bromophenol blue, Congo red, Methyl orange, Screened methyl orange, Bromocresol green, Methyl red, Azolitmin red, Bromocresol purple, Bromothymol blue, Phenol red, Neutral red, Naphtholphthalein, Cresol Red, Cresolphthalein, Phenolphthalein, Thymolphthalein, and Alizarine Yellow.

Still other exemplary, non-limiting organic photoredox catalysts include dyes marketed by Life Technologies under the tradename Alexa Fluor® dyes and those marketed by Li-Cor under the tradename IRDye®.

The organic initiators of the present invention(s) include those organic compounds containing at least one carbon-halogen bond, nitrogen-halogen bond, sulfur-halogen bond, oxygen-halogen bond, thiocyanate group, or thiocarbamate group. These compounds may be monomeric small molecules, oligomeric, or polymeric, and contain one or a plurality (more than one) of these types of groups (i.e., a multifunctional molecule). Preferably, the method at least one organic initiator which preferably comprises an organic halide or α-halocarbonyl. As used herein, the term "organic halide" may comprise alkyl, aryl, or benzylic halide. The term "α-halocarbonyl" refers to structure where halogen is bound to carbon alpha, or adjacent, to carbonyl, for example of carboxylic acid, ester, aldehyde, or ketone, preferably ester, such that the resulting radical is stabilized by adjacent carbonyl. Preferably the halo substituent of the organic initiator is bromo, and preferably the organic initiator is an organic bromide or α-bromocarbonyl. It is desirable, but not critical, that the organic (i.e., non-halo) portion of the organic initiator is chemically similar to the organic substrate being polymerized, both for compatibility during polymerization and of the final product. Certain exemplary, non-limiting organic initiators include at least one of the following structures:

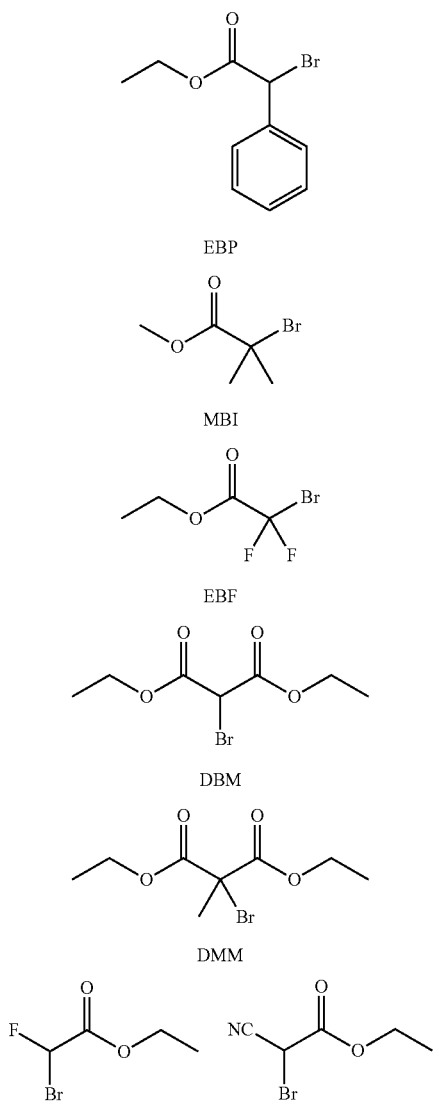

-continued

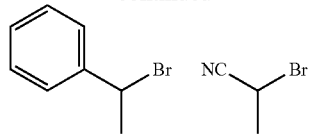

Figure 2:
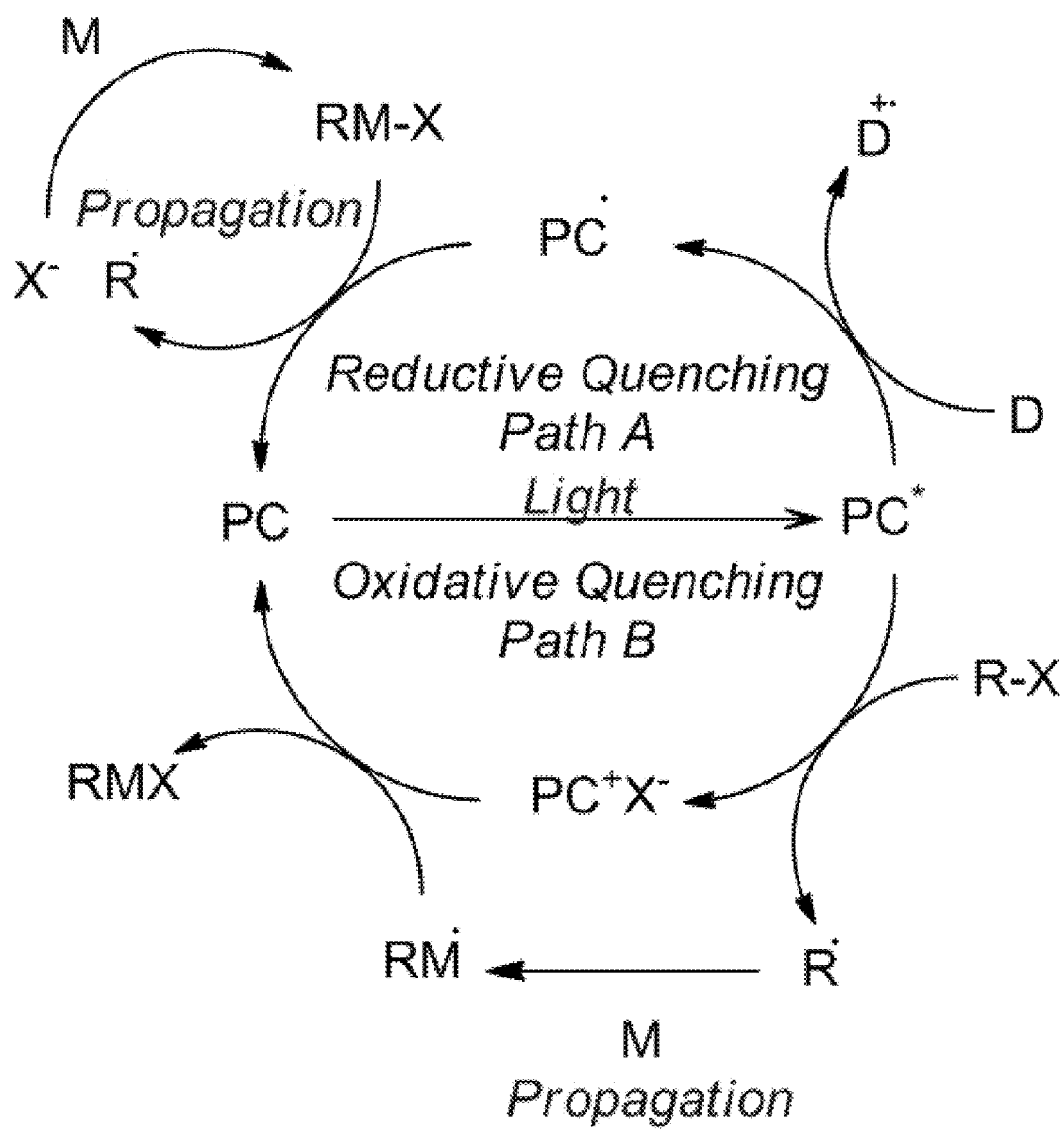
FIG. 2 illustrates exemplary photoredox mediated pathways for polymerization proceeding through reductive or oxidative cycles.

Suitably, the organic initiator exhibits a redox potential in a range of from about −0.2 V to about −2 V, or even more negative, vs. NHE, in aqueous or organic solvents, or in a mixture thereof, though preferably its redox potential is in a range of from about −0.2 V to about −1 V, or from about −0.2 V to about −0.6 V. The combination of the organic photoredox catalyst and the organic initiator are suitably chosen such that the organic photoredox catalyst, upon exposure to and activation by the visible or near-infrared light, is capable of reducing the organic initiator. See, e.g., Path B of FIG. 2. While not intending to be bound by the correctness of any particular theory, the methods may be envisioned as operating in a manner in which the reduced organic initiator forms an organic radical species, capable of initiating a polymerization reaction with the organic prepolymer.

Figure 3:
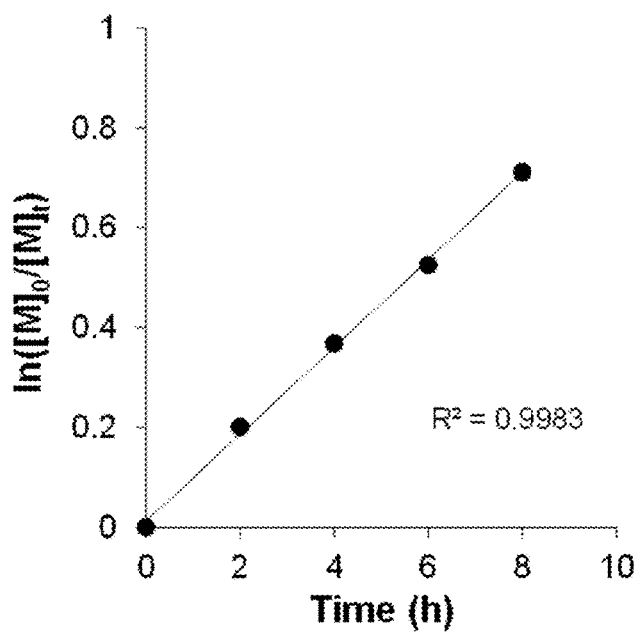
FIG. 3 provides first-order kinetic plot from the conversion data in the "on/off" light irradiation experiment. Time corresponds to hours of irradiation. Performed in 1.00 mL of DMF and 1.00 mL (0.935 mmol) MMA. [MMA]:[EBP]:[perylene]=875:9:1.

Similarly, the polymerization reaction operates under conditions and to form product consistent with proceeding by a reversible addition-fragmentation transfer (RAFT) or atom transfer radical polymerization (ATRP). That is, the methods result in polymerizations that may be characterized by first-order kinetic behavior—i.e., the rate of polymerization with respect to the log of the monomer concentration ([M]) is a linear function of time. See, e.g., FIG. 3. Further, there is a pre-determinable degree of polymerization (i.e., the number average molecular weight (Mn) is a linear function of monomer conversion). In certain embodiments, the methods provide products in which the formed polymers have number average molecular weights (Mn) in a range of from about 10 Daltons to about 1 or 2 million Daltons, or higher. Other independent embodiments provide that this range is from about 10 Dalton to about 100 Daltons, from about 100 Dalton to about 1000 Daltons, from about 1000 Daltons to about 10,000 Daltons, from about 10,000 Daltons to about 100,000 Daltons, from about 100,000 Daltons to about 1 million Daltons, from about 1 million to about 2 million Daltons, or any combination thereof.

Still further, the methods result in the formation of products having a narrow Polydispersity Index. In certain embodiments, the reaction proceeds to yield products in which the formed polymer has a Polydispersity Index (PDI or Mw/Mn ratio) in a range of about 1 to about 2, or in a range of about 1 to about 1.5. In other embodiments, the PDI has a range of from about 1 to about 1.95, to about 1.9, to about 1.85, to about 1.8, to about 17, to about 1.7, to about 1.65, to about 1.6, to about 1.55, to about 1.4, to about 1.45, to about 1.4, to about 1.35, to about 1.3, to about 1.25, to about 1.2, to about 1.15, or to about 1.1. Without intending to be bound by the correctness of any particular theory, it appears that the reaction dynamics provide that the active chain termini are equally susceptible to reaction with monomer allowing uniform/simultaneous growth of all the polymer chains.

Still further, the methods result in the formation of products in which the polymer chain retain their active centers after the full consumption of the monomer. Propagation resumes upon introduction of additional monomer. This unique feature enables the preparation of block copolymers by sequential monomer addition. Accordingly, additional embodiments provide methods for preparing block copolymers, each method comprising (a) exposing a mixture comprising a first organic pre-polymer, an organic photoredox catalyst, and an organic initiator to a source of visible or near-infrared light under conditions and for a time sufficient to polymerize the first organic pre-polymer; and (b) exposing a mixture comprising a second organic pre-polymer, an organic photoredox catalyst, and an organic initiator to a source of visible light under conditions and for a time sufficient to polymerize the second organic pre-polymer. The first and second organic pre-polymer, organic photoredox catalyst, organic initiator, and nature of the visible or near-infrared light are as otherwise described herein.

The reactions may be conducted such that the final polymeric product comprises a homo-polymer or a copolymer (i.e. di-block, tri-block, statistical, gradient copolymer, etc.). Furthermore, the polymerization may be conducted from a multi-functional initiator to produce molecular brush copolymers or other different polymeric architectures. The polymer may or may not be cross-linked.

To this point, the methods have been described in terms of being operable "under conditions and for a time sufficient to polymerize the organic pre-polymer." While not intending to limit these conditions, for the sake of additional clarity, the following exemplary conditions are provided.

The polymerizations may be done in the absence or presence of solvents. Suitable solvents may include benzene or substituted benzenes (e.g., bromobenzene, chlorobenzene, nitrobenzene, etc.), dimethyl acetamide, dimethyl formamide, dimethylsulfoxide (DMSO), acetonitrile, toluene, or $C_{1-6}$ alcohols. Dimethyl formamide is a particularly attractive solvent for this purpose. The choice of solvents depends, in part, on solubility of the reaction components and products. While anhydrous systems appear to be preferred, in some cases, aqueous systems may be useful, though consideration must be made with respect to the apparent radical nature of the polymerizations. While the reactants and products may be dissolved or dispersed in the solvents employed, the use of emulsion, microemulsion or other heterogeneous conditions may also be also desirable, depending on the nature of the reactants and products. Reactions may be conducted in batch or by flow processes.

Typically, the reactions are conducted under anaerobic conditions, where at least some effort has been made to remove ambient air or oxygen. The partial pressure of oxygen in the mixtures is preferably less about than 10 torr. It should be appreciated that once deoxygenated, a viscous solvent or reaction mixture may not require continued deaerating or inerting conditions in order to meet these limits.

The methods are flexible with respect to operating temperature, and temperature may or may not be controlled. Good results have been obtained even at ambient (e.g., 20-35° C.) temperatures. The operating temperature window is clearly much wider than this, and certain embodiments provide that the methods are operated at temperatures in a range of about 15° C. to about 200° C., depending, for example, on the organic pre-polymer, organic photoredox catalyst, organic initiator, and absence or presence and nature of solvent.

The light may be provided by natural or artificial sources, and the intensities of the light used in the methods may range from about 1, 2, 3, 4, 5, or 10 Watts to about 50, 25, 10, or 5 Watts. Exemplary embodiments within these ranges, then, include from about 1 to about 10 Watts or from about 3 to about 25 Watts. In some embodiments, natural, wavelength filtered, or amplified sunlight may be used.

Reaction times will be dependent on the particular system chosen or monomer conversion desired, though exemplary reactions times are provided in the Examples, each time presented being an individual embodiment of this feature.

To this point, the embodiments have been presented in terms of methods of polymerization, though it should be apparent that the products prepared by these methods (i.e., resulting from any one or more embodiments of the methods presented herein) are also contemplated as part of the present invention(s). In particular, certain embodiments of the present invention include at least those polymers and copolymers which exist either in the presence of the reaction mixture or isolated therefrom. Additional embodiments include polymers and copolymers having narrow polydispersity indices, which are substantially free of metals and metalloids derived from photoredox catalysts. Similarly, any article produced using the polymers so-prepared is considered within the scope of the present invention. Articles include those used in electronics or medical applications, especially those susceptible to metal or metalloid ion migration or leaching. Some non-limiting exemplary examples include, but are not limited to, implantable medical devices (e.g., heart valves, tissue engineering scaffolds for bone or muscle therapy), topological applications (e.g., contact lenses, wound dressings, or dental applications), electronic systems (e.g., such as used in computers, telephones, or electronic displays), articles which contact humans (e.g., clothes or toys) or food (e.g., containers or wrappers), or articles which may be discarded to the environment, either purposefully or accidentally (such as to landfills or by incineration).

TERMS

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

Throughout this specification, words are to be afforded their normal meaning, as would be understood by those skilled in the relevant art. However, so as to avoid misunderstanding, the meanings of certain terms will be specifically defined or clarified.

The term "alkyl" as used herein refers to a linear, branched, or cyclic saturated hydrocarbon group typically although not necessarily containing 1 to about 24 carbon atoms, preferably 1 to about 12 carbon atoms, or 1 to about 6 carbon atoms, 1 to about 3 carbon atoms. Certain embodiments provide that the alkyl is methyl, ethyl, n-propyl, isopropyl, n-butyl, isobutyl, tert-Butyl, octyl, decyl, or the like, as well as cycloalkyl groups such as cyclopentyl, cyclohexyl or the like. Generally, although again not necessarily, alkyl groups herein contain 1 to about 12 carbon atoms. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl groups substituted with one or more substituent groups, and include "heteroatom-containing alkyl" and "heteroalkyl," which terms refer to alkyl groups in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl groups, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl groups substituted with one or more substituent groups, and the terms "heteroatom-containing alkenyl" and "heteroalkenyl" refer to alkenyl groups in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl groups, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aromatic" refers to the ring moieties which satisfy the Hückel 4n+2 rule for aromaticity, and includes both aryl (i.e., carbocyclic) and heteroaryl (also called heteroaromatic) structures, including aryl, aralkyl, alkaryl, heteroaryl, heteroaralkyl, or alk-heteroaryl moieties.

The term "aryl" as used herein, and unless otherwise specified, refers to an aromatic substituent or structure containing a single aromatic ring or multiple aromatic rings that are fused together, directly linked, or indirectly linked (such that the different aromatic rings are bound to a common group such as a methylene or ethylene moiety). Unless otherwise modified, the term "aryl" refers to carbocyclic structures. Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined above.

The terms "cyclic" and "ring" refer to alicyclic or aromatic groups that may or may not be substituted and/or heteroatom-containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic. The term "acyclic" refers to a structure in which the double bond is not contained within a ring structure.

The terms "halo" and "halogen" are used in the conventional sense to refer to a chloro, bromo, fluoro, or iodo substituent.

The term "heteroatom-containing" as in a "heteroatom-containing group" refers to a hydrocarbon molecule or molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

By "substituted" as in "substituted alkyl," "substituted aryl," and the like, as alluded to in some of the aforementioned definitions, is meant that in the alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_1$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl ((CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—NH$_2$), mono-($C_1$-$C_{24}$ alkyl)-substituted carbamoyl (—(CO)NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ alkyl)), di-($C_1$-$C_{24}$ haloalkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl) substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl, thiocarbamoyl (—(CS)—NH$_2$), mono-($C_1$-$C_{24}$ alkyl)-substituted thiocarbamoyl (—(CO)—NH($C_1$-$C_{24}$ alkyl)), di-($C_1$-$C_{24}$ alkyl)-substituted thiocarbamoyl (—(CO)—N($C_1$-$C_{24}$ alkyl)$_2$), mono-($C_5$-$C_{24}$ aryl) substituted thiocarbamoyl (—(CO)—NH-aryl), di-($C_5$-$C_{24}$ aryl)-substituted thiocarbamoyl (—(CO)—N($C_5$-$C_{24}$ aryl)$_2$), di-N—($C_1$-$C_{24}$ alkyl), N—($C_5$-$C_{24}$ aryl)-substituted thiocarbamoyl, carbamido (—NH—(CO)—NH$_2$), cyano(—C≡N), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino, di-($C_1$-$C_{24}$ alkyl)-substituted amino, mono-($C_5$-$C_{24}$ aryl) substituted amino, di-($C_5$-$C_{24}$ aryl)-substituted amino, $C_1$-$C_{24}$ alkylamido (—NH—(CO)-alkyl), $C_6$-$C_{24}$ arylamido (—NH—(CO)-aryl), imino (—CR=NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$OH), sulfonate (SO$_2$O—), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl-SO$_2$—N(H)alkyl), $C_1$-$C_{24}$ dialkylaminosulfonyl-SO$_2$—N(alkyl)$_2$, $C_5$-$C_{24}$ arylsulfonyl (—SO$_2$-aryl), boryl (—BH$_2$), borono (—B(OH)$_2$), boronato (—B(OR)$_2$ where R is alkyl or aryl), phosphono (—P(O)(OH)$_2$), phosphonato (—P(O)(O)$_2$), phosphinato (P(O)(O—)), phospho (—PO$_2$), and phosphine (—PH$_2$); and the moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably C2-C6 alkynyl), $C_5$-$C_{24}$ aryl (preferably $C_5$-$C_{24}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

Where substituents are described as "substituted" or "optionally substituted," these Fn substitutions preferably comprise halo, hydroxyl, $C_1$-$C_3$ alkoxy, $C_1$-$C_6$ alkylcarbonyl (—CO-alkyl), $C_2$-$C_{24}$ alkoxycarbonyl ((CO)—O-alkyl), carboxy (—COOH), carbamoyl (—(CO)—NH$_2$), mono-($C_1$-$C_6$ alkyl)-substituted carbamoyl (—(CO)NH($C_1$-$C_6$ alkyl)), di-($C_1$-$C_6$ alkyl)-substituted carbamoyl (—(CO)—N($C_1$-$C_6$ alkyl)$_2$), cyano(—C≡N), cyanato (—O—C≡N), thiocyanato (—S—C≡N), formyl (—(CO)—H), amino (—NH$_2$), mono-($C_1$-$C_6$ alkyl)-substituted amino, or di-($C_1$-$C_6$ alkyl)-substituted amino.

By "functionalized" as in "functionalized alkyl," "functionalized olefin," "functionalized cyclic olefin," and the like, is meant that in the alkyl, olefin, cyclic olefin, or other moiety, at least one hydrogen atom bound to a carbon (or other) atom is replaced with one or more functional groups such as those described herein and above. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups such as those specifically enumerated above. Analogously, the above-mentioned groups may be further substituted with one or more functional groups such as those specifically enumerated.

Unless otherwise indicated, the term "isolated" means physically separated from the other components so as to be free of solvents or other impurities; additional embodiments include those where the compound is substantially the only solute in a solvent or solvent fraction, such a analytically separated in a liquid or gas chromatography phase.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present. Similarly, the phrase "optionally isolated" means that the target molecule or other material may or may not be separated from other materials used or generated in the method, and, thus, the description includes separate embodiments where the target molecule or other material is separated and where the target molecule or other material is not separated, such that subsequence steps are conducted on isolated or in situ generated product.

The terms "separating" or "separated" carries their ordinary meaning as would be understood by the skilled artisan, insofar as it connotes separating or isolating the material (e.g., terephthalic acid or ester) from other starting materials or co-products or side-products (impurities) associated with the reaction conditions yielding the material. As such, it infers that the skilled artisan at least recognizes the existence of the product and takes specific action to separate or isolate it. Absolute purity is not required, though preferred, as the material may contain minor amounts of impurities and the separated or isolated material may contain residual solvent or be dissolved within a solvent used in the reaction or subsequent purification of the material.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1

Materials and Methods

Example 1.1

Experimental Methods

All chemicals were purchased from Sigma Aldrich. Methyl methacrylate (MMA), n-butyl acrylate, and styrene were purified by vacuum distillation. Ethyl α-bromophenylacetate (EBP), methyl α-bromoisobutyrate (MBI), ethyl bromodifluoroacetate (EBF), diethyl bromomalonate (DBM), and diethyl 2-bromo-2-methylmalonate (DMM) were degassed with one freeze-pump-thaw cycle. Perylene (sublimed grade, ≥99.5%) was used as received and DMF (anhydrous, ≥99.8%) was sparged with nitrogen. 12 inch Flex LED Strips-5050, Double-Density (4 Watt) were purchased from Creative Lighting Solutions. NMR spectra were recorded on a Varian Inova 300 MHz spectrometer. Chemical shifts were referenced to internal solvent resonances and are reported as parts per million relative to tetramethylsilane. MALDI-TOF data was provided by the California Institute of Technology Mass Spectrometry Facility. Polymer molecular weights were determined utilizing THF as the eluent (1.0 mL/min) by multi-angle light scattering (MALS) gel permeation chromatography (GPC) using a miniDAWN TREOS light scattering detector, a Viscostar viscometer, and an OptilabRex refractive index detector, all from Wyatt Technology. An Agilent 1200 UV-Vis detector was also present in the detector stack. Absolute molecular weights were determined assuming 100% mass recovery.

As used herein, the symbol $Đ$ refers to polydispersity index (PDI or $M_w/M_n$).

Example 1.2

General Polymerization Conditions/Screening Results

Figure 4:
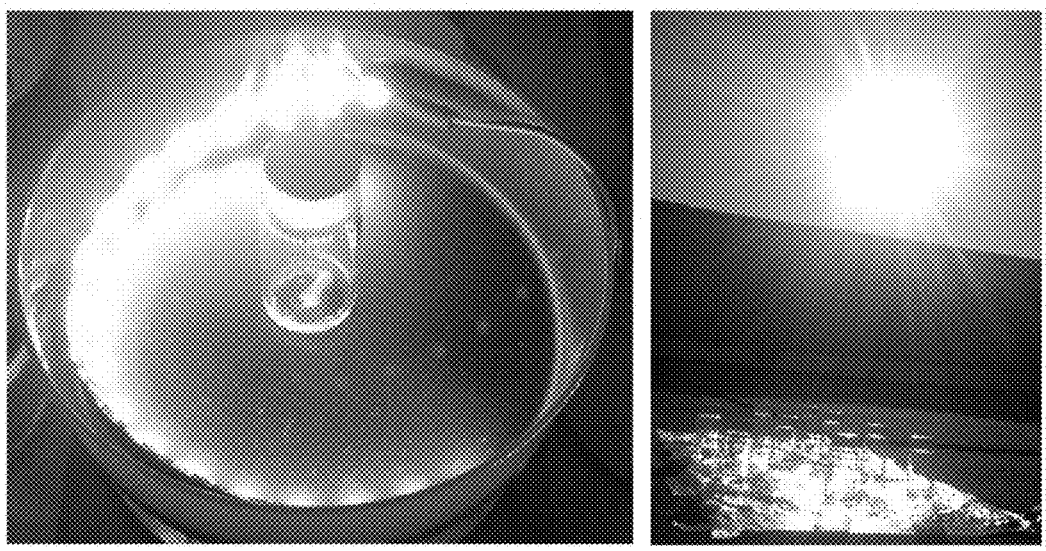
FIG. 4 provides illustrations of experimental set-ups for polymerizations conducted using LED irradiation (left) and natural sunlight (right).

Polymerizations were performed in a glovebox with a nitrogen atmosphere. A 20 mL vial was loaded with a stir bar and perylene, which was dissolved in a solution of 1.00 mL DMF and 1.00 mL MMA, as specified in the polymerization tables (Table 1). The initiator was added by syringe. For LED irradiation, the vial was placed on the center of a stir plate with one Double-Density LED Flex strip surrounding the vial in a circle with a 2.5 inch radius (FIG. 4). The polymerization was allowed to proceed for the times specified in the polymerization tables, after which the vial was removed from the glovebox and the reaction mixture was poured into 100 mL of methanol. The mixture was allowed to stir for 1 hour, and the polymer was isolated by filtration and dried under vacuum at ambient temperature to a constant weight. For natural sunlight irradiation, (performed at Caltech on the roof of Crellin Laboratory on Oct. 5, 2013 from 8:00 am to 6:00 pm), the polymerization reaction was prepared as mentioned above in a glovebox, before the sealed vials were brought to the roof. The vials were placed on a single sheet of aluminum foil and were irradiated for 10 hours without stirring (FIG. 4). For the "on/off" light irradiation experiment, the general polymerization conditions were used, and for the "off" time periods, the reaction was placed in a metal container sealed with a metal lid. The polymer was isolated as stated above. For conversion data, a 0.2 mL aliquot was taken by syringe from the polymerization reaction and quenched into a septum sealed vial containing 0.6 mL of undried $CDCl_3$ containing 250 ppm BHT. $^1H$ NMR was used to quantify the monomer conversion. The volatiles were removed and the residue was redissolved in THF for GPC analysis.

TABLE 1

Results from the Photoredox Organocatalyzed ATRP of MMA.[a]

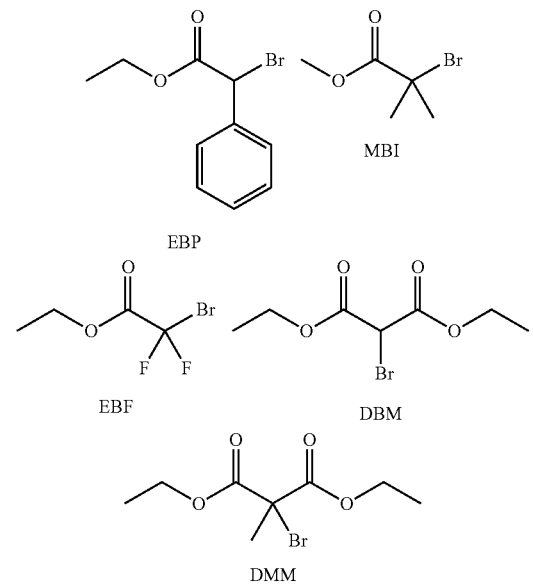

| Run No. | [NMA]:[1]:[1] | Initiator (I) | mol % 1 (× 10³) | Time (h) | Yield[c] (%) | $M_w$[d] (kDa) | Đ[d] ($M_w/M_n$) |
|---|---|---|---|---|---|---|---|
| 1 | 875:9:1 | EBP | 1.1 | 24 | 52.9 | 82.5 | 1.49 |
| 2 | 875:9:1 | MBI | 1.1 | 24 | 35.0 | 165 | 1.78 |
| 3 | 875:9:1 | EBF | 1.1 | 24 | 63.1 | 146 | 1.53 |
| 4 | 875:9:1 | DBM | 1.1 | 24 | 54.8 | 120 | 1.49 |
| 5 | 875:9:1 | DMM | 1.1 | 24 | 54.3 | 156 | 1.50 |
| 6[b] | 875:9:1 | EBP | 1.1 | 10 | 59.2 | 53.1 | 1.29 |
| 7[b] | 875:9:1 | MBI | 1.1 | 10 | 64.9 | 63.5 | 1.50 |
| 8[b] | 875:9:1 | EBF | 1.1 | 10 | 56.5 | 116 | 1.18 |
| 9[b] | 875:9:1 | DBM | 1.1 | 10 | 56.5 | 50.3 | 1.37 |
| 10[b] | 875:9:1 | DMM | 1.1 | 10 | 49.1 | 43.4 | 1.34 |
| 11 | 875:18:1 | EBP | 1.1 | 24 | 52.7 | 60.2 | 1.68 |
| 12 | 875:18:1 | MBI | 1.1 | 24 | 52.1 | 142 | 1.72 |
| 13 | 875:18:1 | EBF | 1.1 | 24 | 61.9 | 95.9 | 1.65 |
| 14 | 875:18:1 | DBM | 1.1 | 24 | 72.9 | 100 | 1.75 |
| 15 | 875:18:1 | DMM | 1.1 | 24 | 70.6 | 80.6 | 1.77 |
| 16 | 875:1:1 | EBP | 1.1 | 24 | 55.9 | 92.1 | 1.65 |
| 17 | 875:1:1 | MBI | 1.1 | 24 | 81.2 | 300 | 1.74 |
| 18 | 875:1:1 | EBF | 1.1 | 24 | 79.2 | 246 | 1.70 |
| 19 | 875:1:1 | DBM | 1.1 | 24 | 74.3 | 106 | 1.67 |
| 20 | 875:1:1 | DMM | 1.1 | 24 | 75.7 | 123 | 1.82 |

[a]Performed in 1.00 mL of DMF and with 1.00 mL (0.935 mmol) of MMA. Initiators (I) used were ethyl α-bromophenylacetate (EBP), methyl α-bromoisobutyrate (MBI), ethyl bromodifluoracetate (EBF), diethyl bromomalonate (DBM), and diethyl 2-bromo-2-methylmalonate (DMM).
[b]Samples were irradiated by a white LED or natural sunlight.
[c]Isolated yield.
[d]Determined by light-scattering.

Example 2

Results of Testing—Set 2

Polymerizations were performed in 20 mL vials with a stir bar. In a glovebox, the vials were loaded with an organic dye, MMA, and initiator (methyl-2-bromopropionate, MBP). The vials were sealed under a nitrogen atmosphere and brought out of the glovebox and were irradiated with a fluorescent lamp for the times specified in Table 2. Control runs excluding light or the initiator were performed over the course of 5 days and produced trace polymer product. Polymerizations were performed neat or with solvent.

TABLE 2

Summary of Initial Polymerizations.

| Run No. | MMA (g) | Dye (mg) | MBP (mg) | Time (h) | Yield (mg) | $M_w$ (kDa) | PDI $(M_w/M_n)$ |
|---|---|---|---|---|---|---|---|
| 1[a] | 5.616 | Perylene (35.4) | 92.8 | 72 | 585 | 1529 | 1.23 |
| 2[a] | 5.616 | Perylene (70.8) | 92.8 | 72 | 776 | 1576 | 1.36 |
| 3[a] | 2.808 | Perylene (37.3) | 0 | 120 | Trace | — | — |
| 4[a,b] | 2.808 | Perylene (37.3) | 92.8 | 120 | Trace | — | — |
| 5[c] | 2.808 | Perylene (1.0) | 74.8 | 39 | 565 | 811.5 | 1.27 |
| 6[c] | 2.808 | Eosin Y (1.8) | 74.8 | 39 | 279 | 1476 | 1.15 |
| 7[c] | 2.808 | Fluorescein (1.0) | 74.8 | 39 | 244 | 873.6 | 1.33 |
| 8[c] | 2.808 | Perylene (1.0) anhydride | 74.8 | 39 | 59 | 2282 | 1.19 |

[a]Reaction was performed in neat MMA.
[b]Reaction was performed in the dark.
[c]Reaction was performed with 1 mL of DMF.

Example 3

Results of Expanded Testing Perylene as a Photo-Organocatalyst

To explore further if perylene could serve as a photoorganocatalyst for ATRP, several initiators were explored in the polymerization of methyl methacrylate (MMA), with ethyl α-bromophenylacetate (EBP) proving to be the most efficient. Irradiation of a solution of perylene in DMF, with 9 equivalents of EBP, and 875 equivalents of MMA by a white LED for 24 hours afforded polymethyl methacrylate (PMMA) in 52.9% yield (run 1, Table 3). The polymer possessed a MW ($M_w$=weight average molecular weight) of 82.5 kDa and $Đ$ =1.49. Control experiments revealed that omission of any single component (perylene, EBP, or the light-source) resulted in no polymer product, even after 72 hours. Changing the light source to an orange LED also failed to produce polymer after 24 hours of irradiation. The polymerization did not tolerate oxygen, but can be performed neat. Additionally, natural sunlight can replace the LED to afford PMMA with $Đ$ =1.29. (run 2, Table 3)

TABLE 3

Results from the Photoredox Organocatalyzed ATRP of MMA.[a]

| Run No. | [MMA]:[EBP]:[1] | mol % 1 (×10³) | Time (hr) | Yield[c] (%) | $M_w$[d] (kDa) | $Đ$[d] $M_w/M_n$ |
|---|---|---|---|---|---|---|
| 1 | 875:9:1 | 1.1 | 24 | 52.9 | 82.5 | 1.49 |
| 2[b] | 875:9:1 | 1.1 | 10 | 59.2 | 53.1 | 1.29 |
| 3 | 875:18:1 | 1.1 | 24 | 52.7 | 60.2 | 1.68 |
| 4 | 875:1:1 | 1.1 | 24 | 55.9 | 92.1 | 1.65 |
| 5 | 437:1:1 | 2.2 | 22 | 70.9 | 81.8 | 1.56 |
| 6 | 437:0.5:1 | 2.2 | 24 | 60.2 | 215 | 1.59 |

[a]Performed in 1.00 mL of DMF and with 1.00 mL (0.935 mmol) of MMA. Samples were irradiated by a white LED or natural sunlight[b].
[c]Isolated yield.
[d]Determined by light-scattering.

Figure 5:
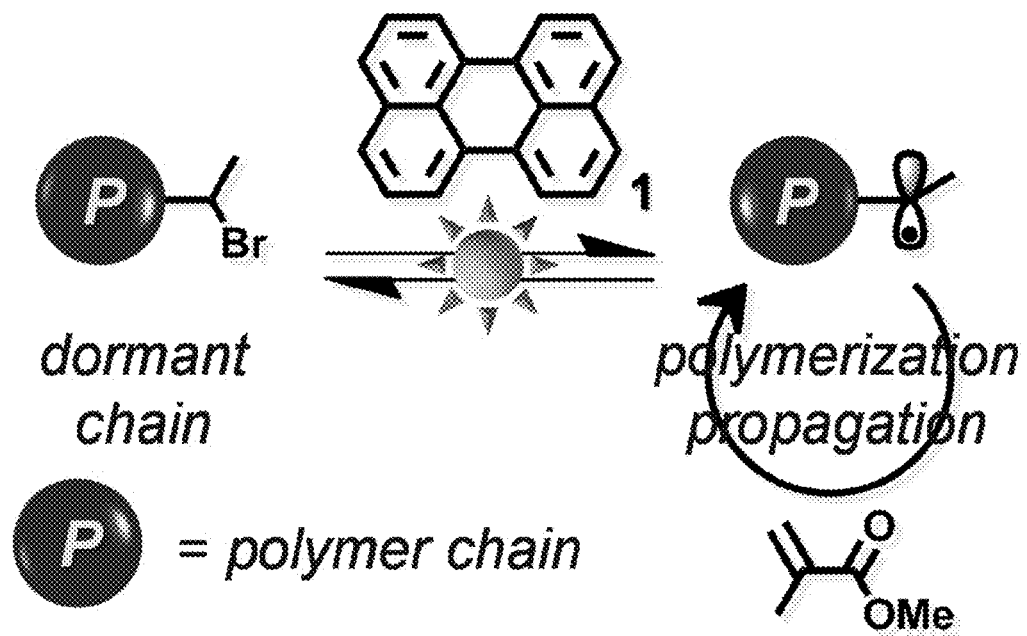
FIG. 5 illustrates the control of the equilibrium between dormant polymer chains and active propagating radical species is enabled by photoredox organocatalyzed ATRP of methyl methacrylate mediated by perylene and visible light.
Figure 6:
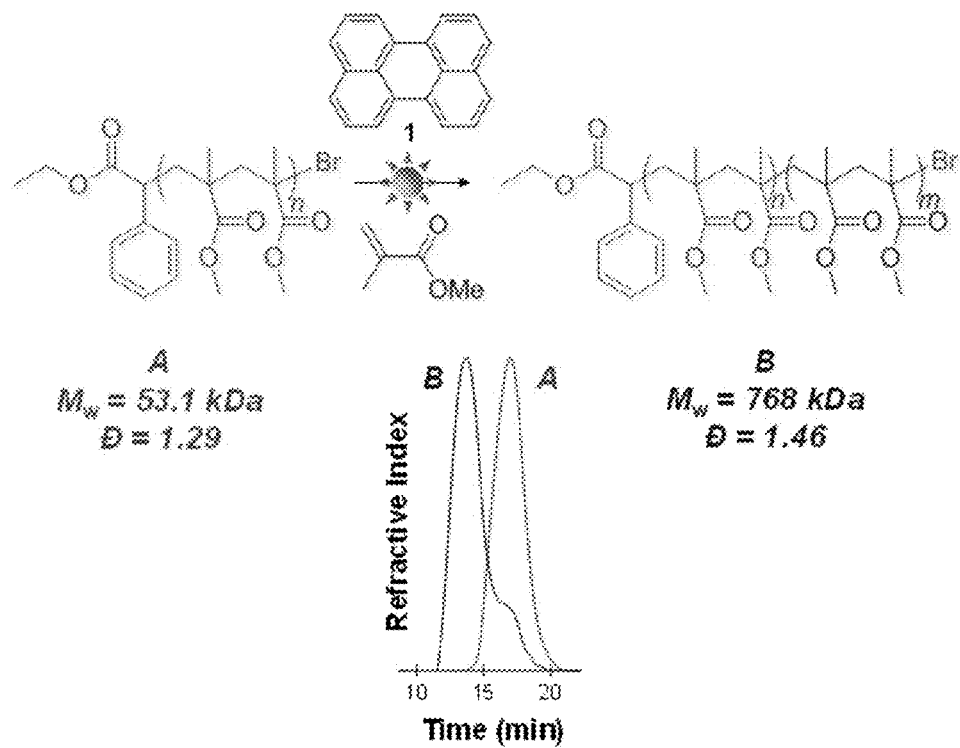
FIG. 6 illustrates chain extension polymerization from an isolated polymer (top). GPC traces (bottom) of the polymeric initiator (A) and the polymer after chain extension (B).

To provide further evidence that supports the hypothesis that perylene catalyzes the polymerization of MMA through an ATRP mechanism, an oligomer was analyzed by MALDI-TOF to determine the chain-end groups. A minor set of peaks could be assigned to PMMA bearing ethyl 2-phenylacetate and bromo chain-end groups, while the major set had a mass to charge ratio that was lower by 79, revealing the absence of the bromo chain-end group. This observation implies that the polymerization initiation involves EBP, but left to question the desired reversible deactivation of the radical. It has been observed that, during MALDI-TOF analysis, ionization can cleave the bromo chain-end groups from polymers produced through ATRP. Thus, to determine if the bromo chain-end group is present on the isolated polymer, a chain extension experiment was performed. An isolated polymer was utilized as the initiator, in replace of EBP, and reintroduced to the polymerization conditions (See, e.g., FIGS. 5 and 6). After isolation, it was shown that greater than 90% of the polymer chains participated in chain growth. This is on par with many examples of metal catalyzed ATRP and strongly supports the presence of the bromo chain-end group, at least on the majority of the isolated polymer chains.

To further understand this polymerization, the effect of initiator ratio was investigated. Doubling the ratio of initiator to perylene only decreased the polymer MW by 27% and was accompanied with an increase in $Đ$ ($M_w$=60.2 kDa; $Đ$=1.68, run 3, Table 3). If only one equivalent of EBP was added the polymer produced had a similar MW ($M_w$=92.1 kDa) to when 9 equivalents were used, albeit with a higher $Đ$ (run 4, Table 3). These results suggest that under the current conditions perylene was inefficient at catalyzing the polymerization of multiple polymer chains (a large excess of EBP is required to affect the polymer MW). Decreasing the MMA:EBP:perylene ratio to 437:1:1 led to a higher PMMA yield (70.9%) with $M_w$=81.8 kDa and $Đ$=1.56 (run 5, Table 3). Finally, decreasing the EBP concentration further to a sub-stoichiometric amount enabled the synthesis of high MW PMMA ($M_w$=215 kDa; $Đ$=1.59) (run 6, Table 3).

Figure 7:
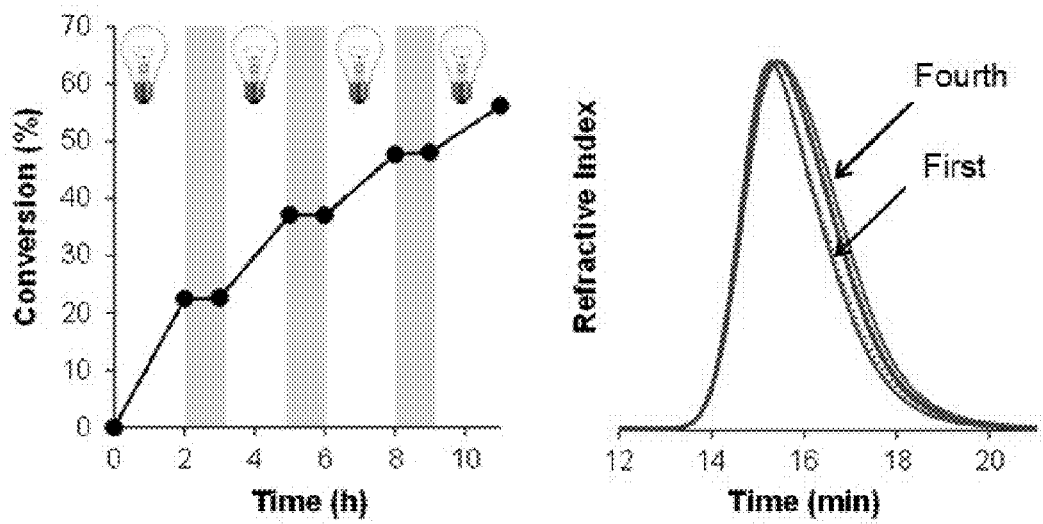
FIG. 7 provides a plot (left) of monomer conversion vs. time demonstrating the control over polymerization propagation through irradiation (represented by a light bulb) and removal of the light source (shaded regions). GPC traces (right) of the polymers taken after the first, second, third, and fourth irradiation period. Dashed lines are GPC traces of aliquots taken after the dark period with color schemes matching the irradiation period.

Together, these data support an interesting polymerization scenario, in which under constant irradiation polymerization propagation is favored over initiation of EBP. To explore if modulating the irradiation would increase initiator efficiency, and to also demonstrate temporal control, a pulsed light sequence was employed using 9 equivalents of EBP to perylene. A repeated cycle of irradiating the reaction for two hours followed by an hour of a "dark" period was performed. An aliquot of the reaction was analyzed for monomer conversion and polymer MW after each time period (FIG. 7). This experiment revealed that polymerization propagation is strictly controlled by light and only occurs during irradiation while no monomer consumption or change in polymer MW occurred during the "dark" periods. Most significantly, no increase in the polymer MW was observed after each additional irradiation period. In fact, although the monomer conversion followed first order kinetics during irradiation, the polymer MW slightly decreased after each irradiation period with an increase in $Đ$ (Table 4). This observation is rationalized by considering that during the "dark" period, perylene migrates away from the growing polymer chain. The next irradiation sequence greatly favors that perylene will initiate polymerization with an unreacted equivalent of EBP, due to the excess of initiator employed. Lastly, the polymer produced from each subsequent irradiation period possesses a decreasingly lower MW because of the lower concentration of MMA available for polymerization, resulting in the overall increase in $Đ$.

TABLE 4

Results from the Photoredox Organocatalyzed ATRP of MMA Using an On/Off Irradiation Sequence.[a]

| Time (h) | Light (on/off) | Conv.[b] (%) | $M_w$[c] (kDa) | $Đ$[c] $(M_w/M_n)$ |
|---|---|---|---|---|
| 0-2 | on | 22.5 | 83.6 | 1.39 |
| 2-3 | off | 22.6 | 83.4 | 1.39 |
| 3-5 | on | 37.1 | 67.2 | 1.59 |

TABLE 4-continued

Results from the Photoredox Organocatalyzed ATRP of MMA Using an On/Off Irradiation Sequence.[a]

| Time (h) | Light (on/off) | Conv.[b] (%) | $M_w$[c] (kDa) | Đ[c] ($M_w/M_n$) |
|---|---|---|---|---|
| 5-6 | off | 37.1 | 68.0 | 1.52 |
| 6-8 | on | 47.8 | 66.4 | 1.54 |
| 8-9 | off | 48.4 | 65.5 | 1.60 |
| 9-11 | on | 56.2 | 64.2 | 1.56 |

[a]Performed in 1.00 mL of DMF and with 1.00 mL (0.935 mmol) of MMA. [MMA]:[EBP]:[I] = 875:9:1.
[b]Monomer conversion measured by $^1$H NMR.
[c]Measured by light-scattering.

Perylene, known to be a strong reductant in its excited state, can serve as a photoredox organocatalyst to mediate ATRP of MMA using visible light and is also effective for the polymerization of styrene and butyl acrylate. Although the current system still lacks the precision of the well-established metal catalyzed ATRP, the ability to utilize an organic catalyst addresses an historical limitation of ATRP. Future work will be directed toward a deeper understanding of this polymerization reaction scheme to enable greater control over the polymerization while exploring the viability of other organic dyes, desirably "green" molecules, to catalyze polymerization.

Example 4

Chain-Extension Polymerization

The polymerization used the general conditions stated above (Example 1.2). 100 mg of isolated polymer ($M_w$=53.1 kDa; Đ =1.29) and 0.5 mg of perylene were dissolved in 1.0 mL of DMF and 1.0 mL of MMA. The reaction was irradiated for 24 hours before the polymer was isolated as previously mentioned. 432 mg (41.7%) of the polymer was isolated ($M_w$=767.5 kDa; Đ =1.46). The GPC analysis of the final polymer product revealed that less than 10% of the original macromonomer did not participate in chain-extension.

Example 5

MALDI-TOF Analysis

Figure 8:
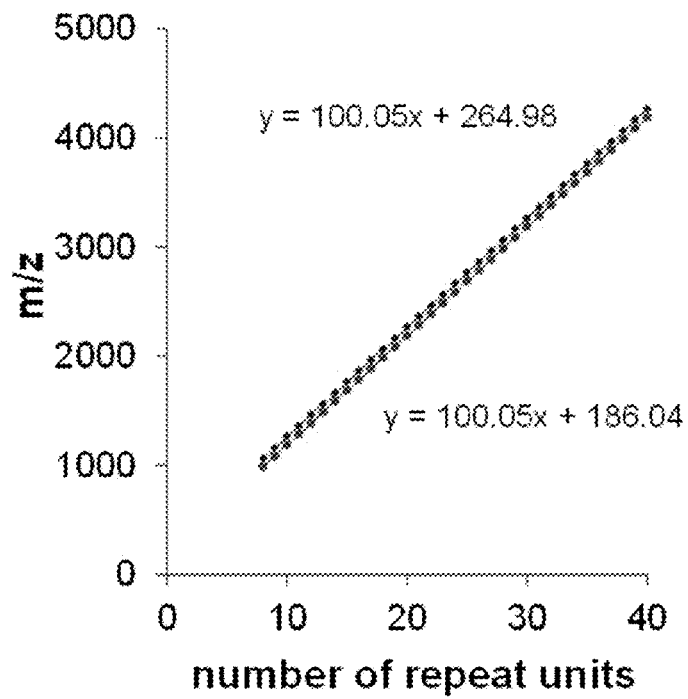
FIG. 8 provides a plot of mass to charge ratio vs. number of monomer repeat units for a PMMA oligomer. The slope of the best-fit trend line corresponds to the molecular weight of methyl methacrylate repeat unit while the y-intercept indicates the molecular weight of the PMMA chain-end groups, as described in Example 5.
Figure 9:
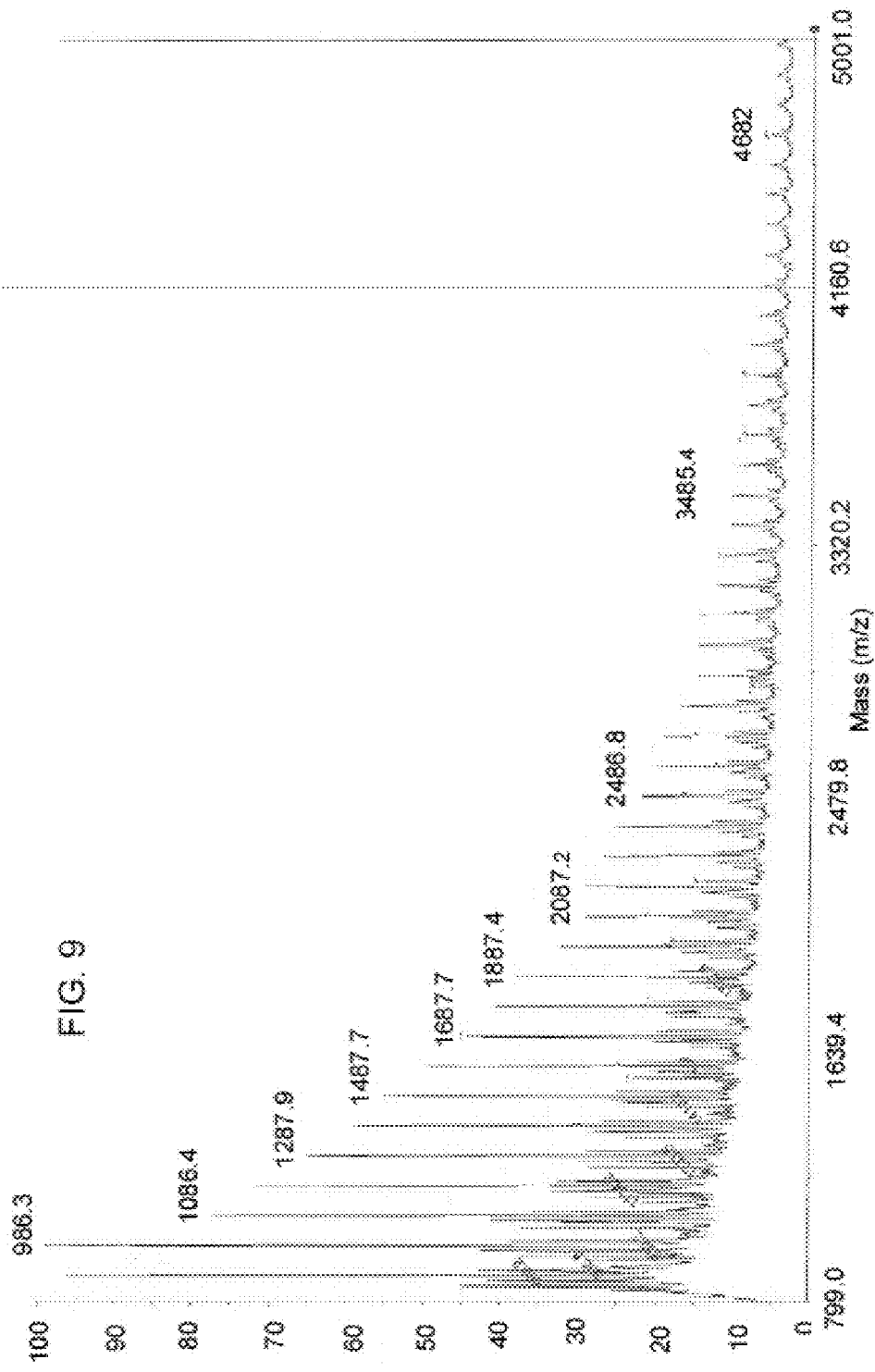
FIG. 9 provide a MALDI-TOF mass spectrum of PMMA oligomer, as described in Example 5.

The polymerization used the general conditions stated above (Example 1.2). A 20 mL vial was loaded with a stir bar, 5.4 mg of perylene, 1.0 mL DMF, and 1.0 mL of MMA. 3.8 µL EPB was added by syringe. The polymerization was irradiated by a white LED for 30 minutes before a 0.2 mL aliquot was injected into a vial containing 1.0 mL of "undried" methanol. The volatiles were removed and the residue was used directly for analysis. Analysis was performed with a Voyager DE-PRO MALDI time-of-flight mass spectrometer (Applied Biosystems) equipped with a nitrogen laser. The sample was dissolved in 250 µL of THF and diluted ×10 with matrix solution (benzylidene malononitrile, 10 mg/mL in THF). To the sample was added NaI in EtOH as an ionizing agent. The instrument mass accuracy is +/−0.1% and was externally calibrated with Sequazyme standard mixture. Results are shown in FIGS. 8 and 9.

Example 6

Styrene Polymerization

The polymerization used the general conditions stated above. A 20 mL was loaded with a stir bar, 2.7 (10.7 µmol, 1 equivalent) mg of perylene, 1.00 mL DMF, and 1.07 mL (9.31 mmol, 870 equivalents) of styrene. 16.4 µL (93.7 µmol, 9 equivalents) EPB was added by syringe. The polymerization was irradiated by a white LED for 23 hours before the reaction was terminated and 167 mg (17.2%) of polystyrene was isolated as mentioned above. M=84.5 kDa, Đ =1.39

Example 7

Butyl Acrylate Polymerization

The polymerization used the general conditions stated above (See Example 1.2). A 20 mL was loaded with a stir bar, 2.7 (10.7 µmol, 1 equivalent) mg of perylene, 1.00 mL DMF, and 1.34 mL (9.35 mmol, 874 equivalents) of n-butyl acrylate. 16.4 µL (93.7 µmol, 9 equivalents) EPB was added by syringe. The polymerization was irradiated by a white LED for 23 hours before the reaction was terminated and 480 mg (40.1%) of polybutyl acrylate was isolated by precipitating the polymer into methanol and decanting off the liquid. M=114 kDa, PDI=1.22.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A method of forming a polymer comprising exposing a mixture that is substantially free of photoredox catalysts comprising metals or metalloids, the mixture comprising:
    (a) an organic pre-polymer,
    (b) an organic photoredox catalyst, and
    (c) an organic initiator to a source of visible light under conditions and for a time sufficient to polymerize the organic pre-polymer; wherein
    the organic photoredox catalyst, upon exposure to and activation by the visible light, is capable of reversibly reducing the organic initiator to form a reduced organic initiator capable of forming an organic radical species, the organic radical species capable of initiating a polymerization reaction with the organic prepolymer; and wherein
    the organic photoredox catalyst, upon exposure to and activation by the visible light, reduces the organic initiator to form the organic radical species, which initiates a polymerization reaction with the organic prepolymer.

2. The method of claim 1, wherein the organic pre-polymer is a monomer or oligomer having polymerizable functional groups.

3. The method of claim 1, wherein the organic pre-polymer comprises an alpha olefin, diolefin, internal olefin, or cyclic olefin.

4. The method of claim 1, wherein the organic pre-polymer comprises an acrylate, methacrylate, acrylamide, methacrylamide, acrylonitrile, vinyl acetate, vinyl ketone, vinyl aldehyde, vinyl chloride, vinyl ether, vinyl amine, vinyl silsesquioxane, vinyl phosphonate, or vinyl sulfonate, or a mixture thereof.

5. The method of claim 4, wherein the organic pre-polymer comprises an acrylate or methacrylate.

6. The method of claim 1, wherein the photoredox catalyst is an organic molecule capable of reaching an excited electronic state when exposed to the visible light, and having at least one absorption or emission wavelength in a range of from about 200 nm to about 800 nm.

7. The method of claim 1, wherein a source of visible light delivers a wavelength of light coincident with at least one absorption wavelength of the photoredox catalyst.

8. The method of claim 1, wherein the photoredox catalyst comprises an aromatic or polyaromatic structure.

9. The method of claim 8, wherein the photoredox catalyst comprises perylene.

10. The method of claim 1, wherein the organic initiator contain at least one carbon-halogen bond, nitrogen-halogen bond, sulfur-halogen bond, oxygen-halogen bond, thiocyanate group, or thiocarbamate group.

11. The method of claim 10, wherein the organic initiator comprises an organic halide or α-halocarbonyl.

12. The method of claim 11, wherein the organic initiator comprises an organic bromide or α-bromocarbonyl.

13. The method of claim 12, wherein the organic initiator contains at least one of the following structures:

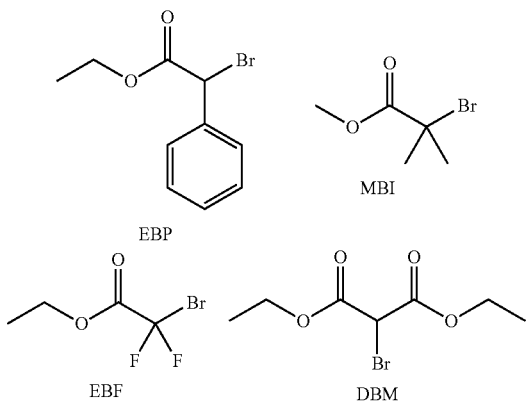

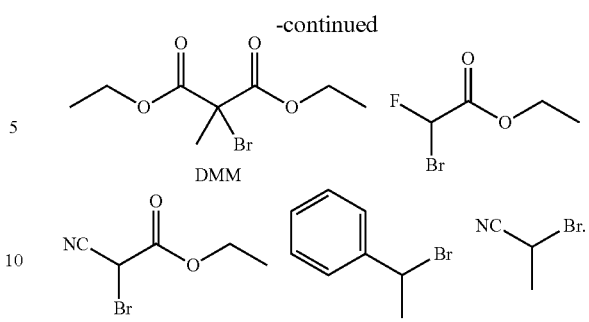

14. The method of claim 1, wherein the organic initiator exhibits a redox potential in a range of about −0.2 to about −2 V.

15. The method of claim 1, wherein the polymerization of the organic pre-polymer proceeds by reversible addition-fragmentation transfer (RAFT) or atom transfer radical polymerization (ATRP).

16. The method of claim 1, wherein the formed polymer has a Polydispersity Index (PDI or Mw/Mn ratio) in a range of about 1 to about 1.5.

17. The method of claim 1, wherein the polymer is a block copolymer, formed by (a) exposing a mixture comprising a first organic pre-polymer, an organic photoredox catalyst, and an organic initiator to a source of visible light under conditions and for a time sufficient to polymerize the first organic pre-polymer; and (b) exposing a mixture comprising a second organic pre-polymer, an organic photoredox catalyst, and an organic initiator to a source of visible light under conditions and for a time sufficient to polymerize the second organic pre-polymer.

18. The method of claim 1, wherein the conditions sufficient to polymerize the organic pre-polymer include an operating temperature in a range of from about 20° C. to about 200° C.

19. The method of claim 15, wherein the polymerization of the organic pre-polymer proceeds by reversible addition-fragmentation transfer (RAFT).

20. The method of claim 15, wherein the polymerization of the organic pre-polymer proceeds by atom transfer radical polymerization (ATRP).

* * * * *